(12) United States Patent
Kasai (10) Patent No.: US 6,717,624 B1
(45) Date of Patent: Apr. 6, 2004

(54) LINE MEMORY IN WHICH READING OF A PRECEDING LINE FROM A FIRST MEMORY AND WRITING OF A CURRENT LINE TO A SECOND MEMORY ARE PERFORMED IN THE SAME TIME PERIOD

(75) Inventor: Yoshio Kasai, Hyogo (JP)

(73) Assignees: Renesas Technology Corp., Tokyo (JP); Mitsubishi Electric System LSI Design Corporation, Itami (JP)

( * ) Notice: Subject to any disclaimer, the term of this patent is extended or adjusted under 35 U.S.C. 154(b) by 402 days.

(21) Appl. No.: 09/755,122

(22) Filed: Jan. 8, 2001

(30) Foreign Application Priority Data

Sep. 22, 2000 (JP) ........................................ 2000-289295

(51) Int. Cl.[7] ................................................ H04N 9/64
(52) U.S. Cl. .................... 348/718; 348/719; 365/189.04
(58) Field of Search ................................ 348/714, 718, 348/716, 717; 345/541, 544, 532, 534, 554, 560; 365/189.04, 230.03, 230.05

(56) References Cited

U.S. PATENT DOCUMENTS 5,353,120 A * 10/1994 Lee ............................. 348/555
5,446,496 A * 8/1995 Foster et al. ................. 348/441
5,475,437 A * 12/1995 Song ........................... 348/448
5,559,740 A * 9/1996 Futami et al. ......... 365/189.04
5,841,445 A * 11/1998 Hamamatsu et al. ........ 345/508
6,141,055 A * 10/2000 Li ............................... 348/446

FOREIGN PATENT DOCUMENTS

JP 9-101875 4/1997

* cited by examiner

Primary Examiner—Victor R. Kostak
(74) Attorney, Agent, or Firm—Burns, Doane, Swecker & Mathis, L.L.P.

(57) ABSTRACT

Two memories respectively have memory capacities which are half of a memory capacity required to store data for one line. In a first time-period of a preceding line is read from a first address of the first memory. In a second time-period dot data of a current line is written in that first address, and data of the preceding line is read from a first address of the second memory. In a third time-period, data of the current line is written in the first address of the second memory, and data of the preceding line is read from a second address of the first memory. This is repeated for all current line data. Therefore, reading of the dot data of the preceding line stored in one memory and the writing of the dot data of the current line to another memory is performed in the same time-period.

4 Claims, 9 Drawing Sheets

A CASE WHERE REDUNDANT MEMORY CAPACITY IS 2×2 WORDS

| ADDRESS / LINE | 393H (915) | 392H (914) | 391H (913) | 390H (912) | 38FH (911) | 38EH (910) | 38DH (909) | 38CH (908) | ... | 1H (1) | 0H (0) |
|---|---|---|---|---|---|---|---|---|---|---|---|
| 1 LINE (R) | E | E | E | E | E | E | | | ... | | ◎ |
| 2 LINE (W) | E | E | E | ○ | ○ | ○ | ○ | | ... | ◎ | E |

FIG.7B

A CASE WHERE REDUNDANT MEMORY CAPACITY IS 3×2 WORDS

| ADDRESS / LINE | 393H (915) | 392H (914) | 391H (913) | 390H (912) | 38FH (911) | 38EH (910) | 38DH (909) | 38CH (908) | ... | 3H (3) | 2H (2) | 1H (1) | 0H (0) |
|---|---|---|---|---|---|---|---|---|---|---|---|---|---|
| 1 LINE (R) | E | E | E | E | E | E | | | ... | ◎ | | | E |
| 2 LINE (W) | E | E | ○ | ○ | ○ | ○ | ○ | | ... | | | ◎ | E |

○ : START ADDRESS  
◎ : FINAL ADDRESS  
} : USED AREA

▨ : NON-USED AREA

LINE MEMORY IN WHICH READING OF A PRECEDING LINE FROM A FIRST MEMORY AND WRITING OF A CURRENT LINE TO A SECOND MEMORY ARE PERFORMED IN THE SAME TIME PERIOD

BACKGROUND OF THE INVENTION

1. Field of the Invention

The present invention relates to a line memory, and more particularly to a line memory which is used when signal processing is performed, for example, in a television set (TV) or a video tape recorder (VTR) by using a correlation between a current line and a preceding line.

2. Description of Related Art

A line memory is used in a signal processing in which a correlation between a current line and a preceding line is, for example, used to demultiplex a digitized composite video signal to a luminance signal and color signals (this is called YC demultiplexing) in TV or VTR.

In case of National Television System Committee (NTSC) system and a signal processing frequency of 4 fsc (about 14.3 MHz. Hereinafter called a clock CLK. fsc: color sub-carrier frequency, 1 fsc=3.579545 MHz), a memory capacity required for a line memory is 910 words (1 word=8 bits) in an example case where a resolution of 1 dot is 8 bits and the number of dots in one line is 910 dots.

Figure 8:
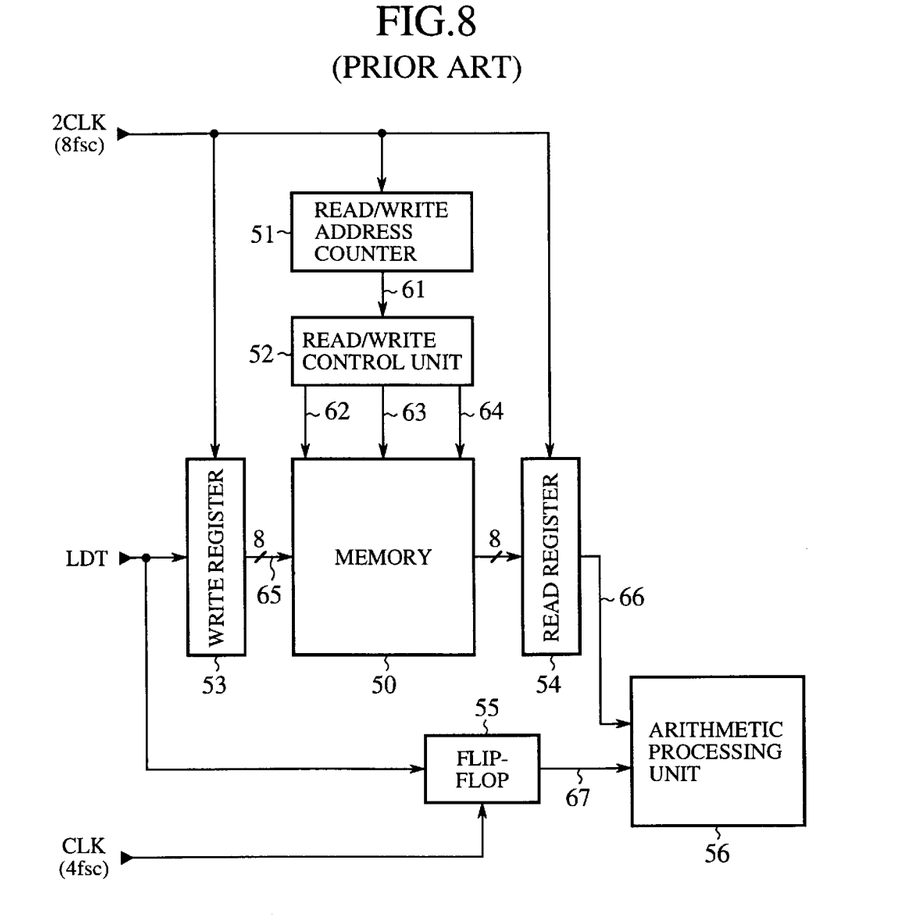
FIG. 8 is a block diagram showing the configuration of a conventional line memory.

FIG. 8 is a block diagram showing the configuration of a conventional line memory.

In FIG. 8, 50 indicates a memory, having a capacity of 910 words (1 word=8 bits), for storing a line of dot data LDT. 51 indicates a read/write address counter operated according to a clock (8 fsc. Hereinafter called a double clock 2CLK) having a frequency which is double of the clock CLK (4 fsc). 52 indicates a read/write control unit for producing an address signal 63, a read enable signal 62 and a write enable signal 64 according to a read/write address signal 61 output from the read/write address counter 51 and controlling a data reading-out from the memory 50 and a data writing-in to the memory 50.

53 indicates a write register for delaying dot data LDT of a current line by one time-period of the double clock 2CLK and outputting the delayed dot data LDT as write register data 65. 54 indicates a read register for delaying dot data of a preceding line read out from the memory 50 by one time-period of the double clock 2CLK and outputting the delayed dot data as read register data 66. 55 indicates a flip-flop for delaying the dot data LDT of the current line by one time-period of the clock CLK and outputting the delayed dot data LDT as dot data 67. 56 indicates an arithmetic processing unit for receiving both the dot data 67 of the current line and the read register data 66 of the preceding line and performing a prescribed picture processing.

Next, an operation is described.

Figure 9:
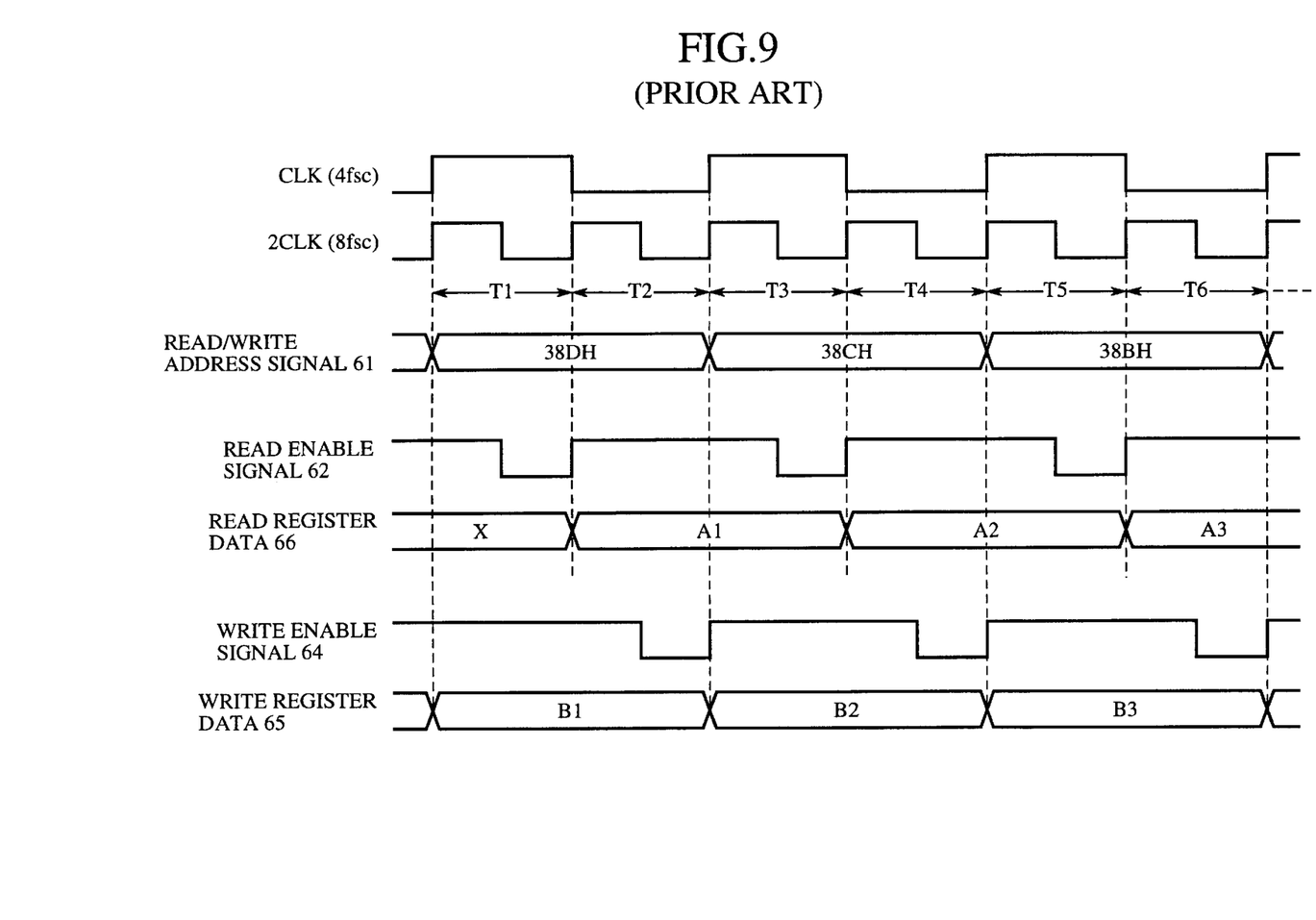
FIG. 9 is a time chart showing an operation of each unit of the conventional line memory.

FIG. 9 is a time chart showing an operation of each unit of the conventional line memory.

In a first time-period T1 of the double clock 2CLK, a reset signal (not shown) is received in the read/write address counter 51 to initialize the read/write address counter 51, an initial value of 38DH (H indicates that 38DH is a hexadecimal number, and 38DH is equivalent to 909 expressed by a decimal number) is set, and the initial value is output as a read/write address signal 61. In the read/write control unit 52, a read enable signal 62 is produced from the read/write address signal 61 which specifies the initial value of 38DH (909), the read enable signal 62 is output to the memory 50 with an address signal 63 of 38DH (909), and dot data A1 of a first line is read out from the memory 50. Thereafter, in a second time-period T2 of the double clock 2CLK, the dot data A1 is output through the read register 54 as read register data 66. Also, the read register data 66 and dot data 67, which is obtained by delaying dot data LDT in the flip-flop 55 by one time-period of the clock CLK, are input to the arithmetic processing unit 56, and a desired picture processing is performed.

In the second time-period T2 of the double clock 2CLK, a write enable signal 64 is produced from the read/write address signal 61, the write enable signal 64 is output to the memory 50 with the address signal 63 of 38DH (909), and write register data 65, which is obtained by delaying dot data LDT in the write register 53 by one time-period of the double clock 2CLK and denotes dot data B1 of a second line, is written in the memory 50. Thereafter, in a next time-period T3 of the double clock 2CLK, a count down operation is performed in the read/write address counter 51, a read/write address signal 61 of 38CH (908) is output from the read/write address counter 51, and the data reading-out from the memory 50 and the data writing-in to the memory 50 are performed in the same manner as the above-described operation. In a following operation, the data reading-out and the data writing-in are alternately performed for each time-period of the clock CLK (4 fsc) while decreasing a counted value of the read/write address counter 51 one by one.

Also, when the counted value is counted down to 0H (0) in the read/write address counter 51, the reading-out of the dot data of the first line and the writing-in of the dot data of the second line are completed, and the reading-out of the dot data of the second line and the writing-in of dot data of a third line are successively performed. Thereafter, in the same manner, the reading-out of dot data of a preceding line and the writing-in of dot data of a current line are performed one after another.

However, because the conventional line memory has the above-described configuration, in the signal processing using the line memory, it is required to perform both the reading-out of the dot data of the preceding line stored in the memory 50 and the writing-in of the dot data of the current line to the memory 50 within one processing time-period (1/(4 fsc)=about 70 ns). Therefore, it is required to set an operating speed of a random access memory (RAM) used in the memory 50 to a speed (8 fsc) double of the signal processing frequency, that is, a signal processing time-period equivalent to ½ (1/(8 fsc)=about 35 ns) of one processing time-period for the signal processing. That is, there is a problem that a RAM operable at high speed has to be used. Also, this high speed type RAM is expensive so as to heighten a cost of the memory 50, and there is another problem that a picture processing apparatus using this high speed type RAM is expensive.

SUMMARY OF THE INVENTION

An object of the present invention is to provide, with due consideration to the problems of the conventional line memory, a line memory in which a RAM obtained at a low cost and operable at low speed is used.

The object is achieved by the provision of a line memory comprising first and second memories respectively having a memory capacity which is half of a memory capacity required to store all pieces of dot data of one line, read address producing means for producing a read address signal to be used to read out the dot data for each dot, write address producing means for producing a write address signal to be used to write the dot data for each dot, and a memory access signal producing unit for performing, for each time-period of a reading-out or a writing-in, both the production of an address signal, which specifies an address of the first memory or the second memory, and a read enable signal, which is used to alternately read out dot data of a preceding line stored in the first memory or the second memory, according to the read address signal produced by the read address producing means and the production of an address signal, which specifies an address of the second memory or the first memory, and a write enable signal, which is used to alternately write dot data of a current line stored in the second memory or the first memory, according to the write address signal produced by the write address producing means. In this line memory according to the present invention, both the reading-out of the dot data of the preceding line stored in the first memory or the second memory and the writing-in of the dot data of the current line to the second memory or the first memory are performed in the same time-period.

Therefore, the line memory can be operated according to a clock CLK of which a signal processing frequency is 4 fsc, a double clock 2CLK having a frequency, which is double of the clock CLK, is not required, and the line memory, in which the memories operable at a low speed and obtained at a low cost, can be obtained.

Also, in the line memory according to the present invention, it is preferred that the dot data of the preceding line is read out from a storing area of a specified address of the first memory or the second memory in a first time-period of the reading-out or the writing-in, and the dot data of the current line is written in the storing area of the address of the first memory or the second memory in a second time-period.

Therefore, the line memory can be operated according to a clock CLK of which a signal processing frequency is 4 fsc, a double clock 2CLK having a frequency, which is double of the clock CLK, is not required, and the line memory, in which the memories operable at a low speed and obtained at a low cost, can be obtained.

The object is also achieved by the provision of a line memory comprising first and second memories respectively having a redundant memory capacity of at least one piece of dot data in addition to a memory capacity which is half of a memory capacity required to store all pieces of dot data of one line, read address producing means for producing a read address signal to be used to read out the dot data for each dot, write address producing means for producing a write address signal to be used to write the dot data for each dot, and a memory access signal producing unit for performing, for each time-period of a reading-out or a writing-in, both the production of an address signal, which specifies an address of the first memory or the second memory, and a read enable signal, which is used to alternately read out dot data of a preceding line stored in the first memory or the second memory, according to the read address signal produced by the read address producing means and the production of an address signal, which specifies an address of the second memory or the first memory, and a write enable signal, which is used to alternately write dot data of a current line stored in the second memory or the first memory, according to the write address signal produced by the write address producing means. In this line memory according to the present invention, the address signal produced according to the write address signal in the memory access signal producing unit specifies either an address of an area of the second memory or the first memory, in which no dot data of the preceding line is stored, or an address of the second memory or the first memory which is set to a non-stored state by reading out the dot data of the preceding line, and both the reading-out of the dot data of the preceding line stored in the first memory or the second memory and the writing-in of the dot data of the current line to the second memory or the first memory are performed in the same time-period.

Therefore, the line memory can be operated according to a clock CLK of which a signal processing frequency is 4 fsc, a double clock 2CLK having a frequency, which is double of the clock CLK, is not required, and the line memory, in which the memories operable at a low speed and obtained at a low cost, can be obtained.

Also, in the line memory according to the present invention, it is preferred that a difference between the read address signal produced by the read address producing means and the write address signal produced by the write address producing means in the same time-period is an odd number.

Therefore, the line memory can be operated according to a clock CLK of which a signal processing frequency is 4 fsc, a double clock 2CLK having a frequency, which is double of the clock CLK, is not required, and the line memory, in which the memories operable at a low speed and obtained at a low cost, can be obtained.

DETAILED DESCRIPTION OF THE PREFERRED EMBODIMENTS

Embodiments of the present invention will now be described with reference to the accompanying drawings.

Embodiment 1

Figure 1:
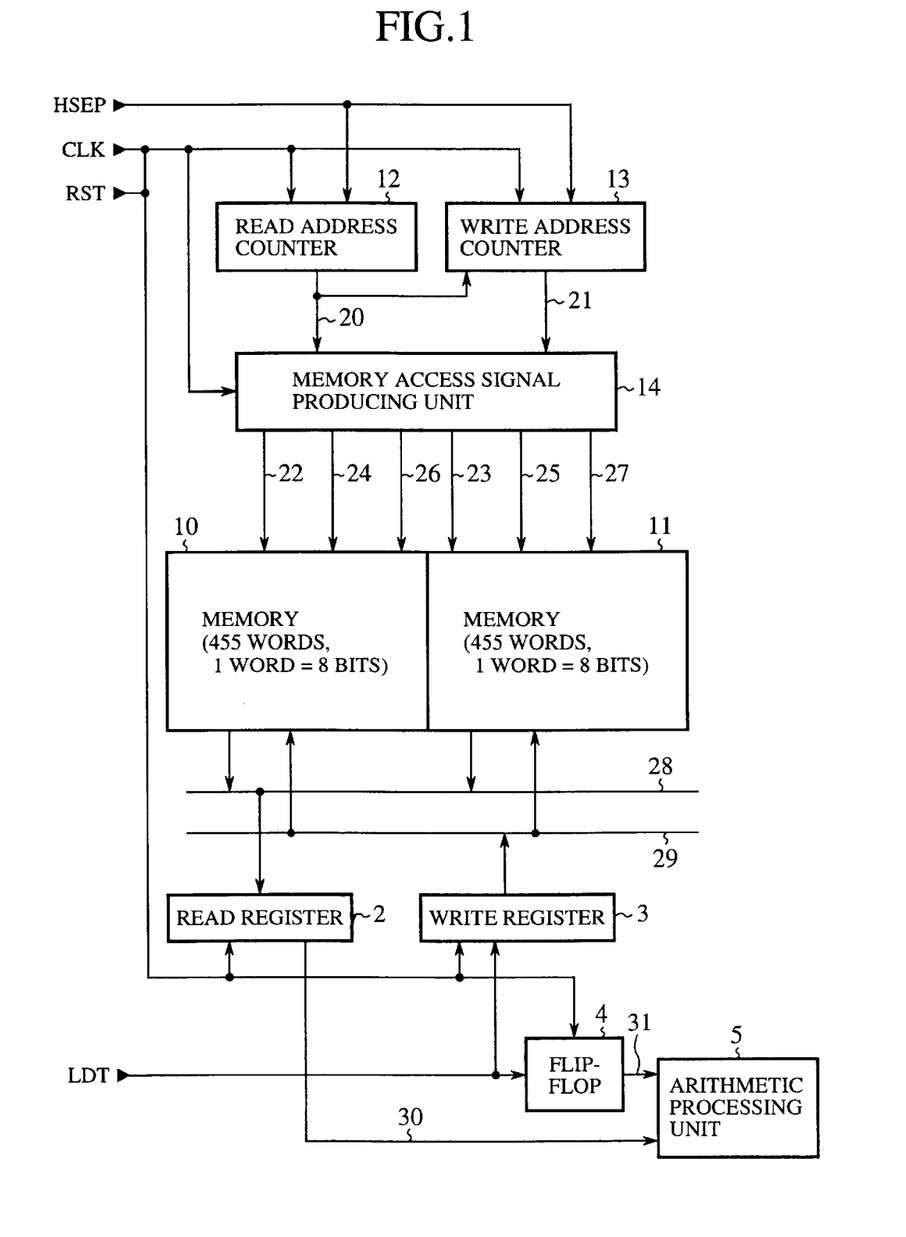
FIG. 1 is a block diagram showing the configuration of a line memory according to a first embodiment of the present invention.

FIG. 1 is a block diagram showing the configuration of a line memory according to a first embodiment of the present invention.

In case of the NTSC system and a signal processing frequency of 4 fsc (about 14.3 MHz. Hereinafter called a clock CLK. fsc: color sub-carrier frequency, 1 fsc=3.579545 MHz), a memory capacity required for a line memory is 910 words (1 word=8 bits) in an example case where a resolution of 1 dot is 8 bits and the number of dots in one line is 910 dots.

In FIGS. 1, 10 and 11 indicate two memories (a first memory and a second memory) having the same memory capacity as each other and respectively having a memory capacity of 455 words which is half of the number of words required for one line. Each of the memories 10 and 11 has a sense amplifier (not shown) and an address decoding unit (not shown). 12 indicates a read address counter (or a read address producing means for being initialized by receiving a reset signal RST, setting an initial value according to a trailing edge detecting signal HSEP which detects a trailing edge of a horizontal synchronization signal Hsync, renewing the initial value according to a clock CLK, and producing a read address signal 20 to be used to read out dot data for each dot.

13 indicates a write address counter (or a write address producing means) for being initialized by receiving the reset signal RST, setting an initial value according to the trailing edge detecting signal HSEP which detects a trailing edge of the horizontal synchronization signal Hsync, renewing the initial value according to the clock CLK, receiving the read address signal 20 and producing a write address signal 21 to be used to write dot data which is obtained by delaying the read address signal 20 by one time-period of the clock CLK.

14 indicates a memory access signal producing unit for producing address signals 22 and 23 (respectively specifying an address of the first or second memory) and read enable signals 24 and 25 according to the read address signal 20 and producing the address signals 22 and 23 and write enable signals 26 and 27 according to the write address signal 21.

Here, an initial value 38DH (H indicates that 38DH is a hexadecimal number, and 38DH is equivalent to 909 expressed by a decimal number) is decreased one by one in both the read address counter 12 and the write address counter 13 until the decreased value reaches 0H (0), and a number 910 equivalent to the number of dots in one line is counted.

2 indicates a read register for delaying dot data of a preceding line, which is read out from the memory 10 or 11 and transmits through a read data bus 28, by one time-period of the clock CLK and outputting the delayed dot data as read register data 30. 3 indicates a write register for delaying dot data LDT of a current line, which is input from an external apparatus (not shown), by one time-period of the clock CLK and transferring the delayed dot data to a write data bus 29.

4 indicates a flip-flop for delaying the dot data LDT of the current line, which is input from the external apparatus (not shown), by one time-period of the clock CLK and outputting the delayed dot data as dot data 31. 5 indicates an arithmetic processing unit for performing a desired processing (for example, a processing for displaying a picture on a picture displaying unit) according to the dot data 31 of the current line delayed by one time-period of the clock CLK and the read register data 30 read out from the read register 2.

Next, an operation is described.

Figure 2:
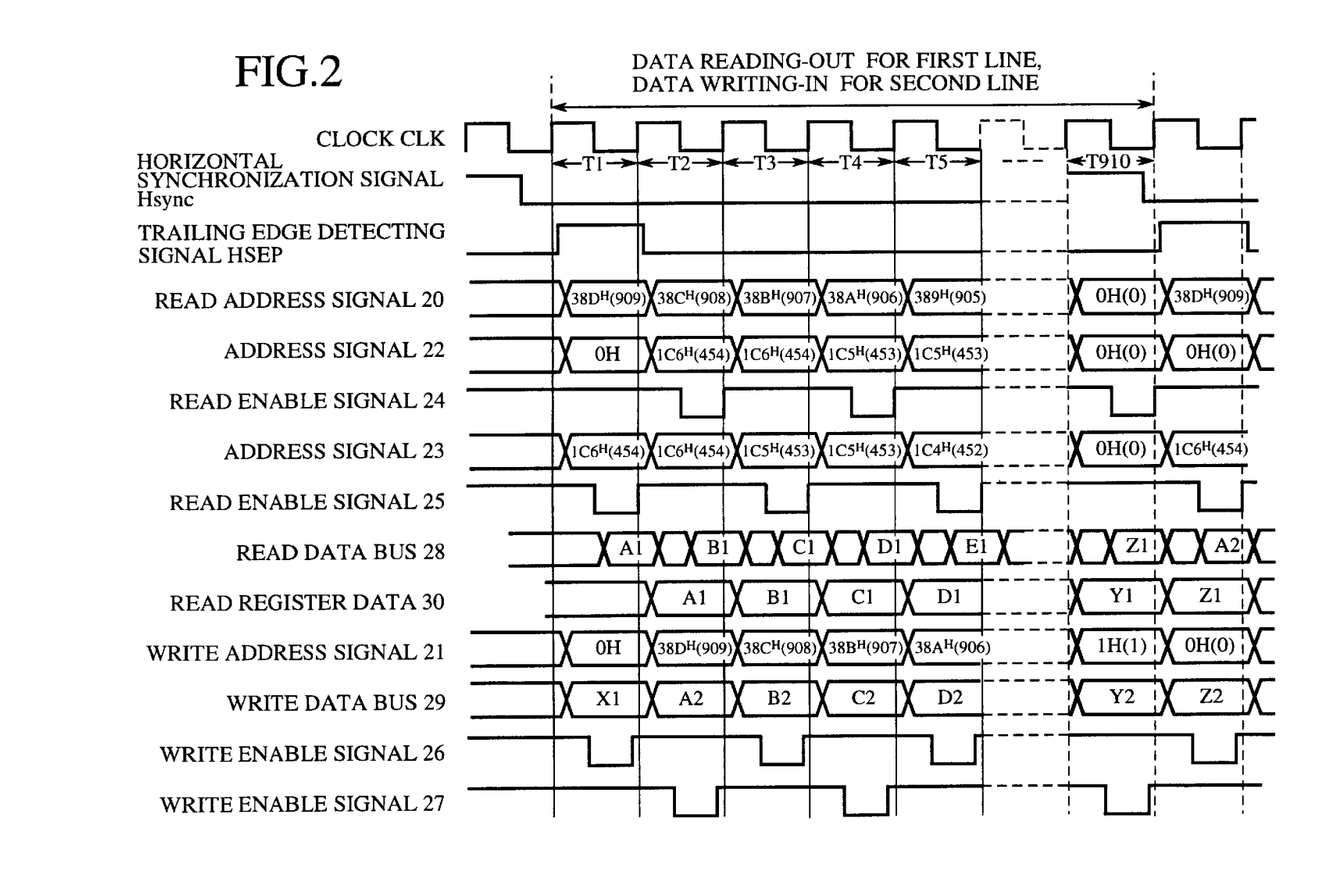
FIG. 2 is a time chart showing an operation of each unit of the line memory according to the first embodiment of the present invention.

FIG. 2 is a time chart showing an operation of each unit of the line memory according to the first embodiment of the present invention.

In FIG. 1, the read address counter 12 and the write address counter 13 are respectively initialized to 0 when a reset signal RST is input to the read address counter 12 and the write address counter 13. Thereafter, as shown in FIG. 2, when a horizontal synchronization signal Hsync is fallen down, a trailing edge detecting signal HSEP, which detects a trailing edge of the horizontal synchronization signal Hsync, is generated in synchronization with a clock CLK. Therefore, an initial value 38DH (909) is set in the read address counter 12 according to the trailing edge detecting signal HSEP, and the initial value 38DH (909) is output as a read address signal 20. Thereafter, in the read address counter 12, the initial value 38DH (909) is counted down to 38CH (908), 38BH (907), - - - according to the clock CLK until the counted value reaches 0H (0).

Also, in the write address counter 13, the read address signal 20 is received, and a write address signal 21, which is obtained by delaying the read address signal 20 by one time-period of the clock CLK, is output.

The selection of the memory 10 or the memory 11, in which a data reading-out operation or a data writing-in operation is performed, is determined according to a least significant bit LSB of either the read address signal 20 or the write address signal 21 input to the memory access signal producing unit 14. That is, in cases where the read address signal 20 or the write address signal 21 is an odd number, the memory 11 is selected. Also, in cases where the read address signal 20 or the write address signal 21 is an even number, the memory 10 is selected.

A reading-out operation of the line memory is initially described.

In this embodiment, dot data is read out from the memory 11 at the start, the data reading-out from the memory 10 and the data reading-out from the memory 11 are alternately performed, dot data is read out from the memory 11 in cases where the read address signal 20 is an odd number, and dot data is read out from the memory 10 in cases where the read address signal 20 is an even number.

In case of the data reading-out for the first line, as shown in FIG. 2, in a time-period T1 of the clock CLK, the read address signal 20 (denoting the initial value of 38DH) output from the read address counter 12 is input to the memory access signal producing unit 14. Because the least significant bit LSB of the read address signal 20 is an odd number, a read enable signal 25 is output from the memory access signal producing unit 14 to the memory 11 with an address signal 23 which specifies an address of 1C6H (454). Thereafter, dot data A1 of the first line is read out from the address 1C6H (454) of the memory 11 to the read data bus 28 according to the read enable signal 25 and the address signal 23, and the dot data A1 is output through the read register 2 as read register data 30. Also, dot data 31 (denoting dot data A2) is obtained by delaying dot data LDT of the second line in the flip-flop 4 by one time-period of the clock CLK. Thereafter, both the dot data A1 of the first line indicated by the read register data 30 and the dot data 31 are input to the arithmetic processing unit 5, and a prescribed processing is performed according to both the dot data A1 and the dot data A2 in the arithmetic processing unit 5.

Here, because no read enable signal 24 is output in the time-period T1 of the clock CLK, no dot data is read out from the memory 10.

In a next time-period T2 of the clock CLK in which the data reading-out for the first line is performed, the counting-down is performed in the read address counter 12, and the read address signal 20 is set to 38CH (908). Thereafter, because the least significant bit LSB of the read address signal 20 is an even number, to access to the memory 10, a read enable signal 24 is output to the memory 10 with an address signal 22 which specifies an address of 1C6H (454). Thereafter, dot data B1 of the first line is read out from the address 1C6H (454) of the memory 10 to the read data bus 28, and the dot data B1 is output from the read register 2 as read register data 30.

Here, because no read enable signal 25 is output in the time-period T2 of the clock CLK, no dot data is read out from the memory 11.

Thereafter, in the same manner as the above-described operation, dot data of the first line stored in the memory 11 and dot data of the first line stored in the memory 10 are alternately read out according to a value of the least significant bit LSB of the read address signal 20 in time-periods T3, T4, - - - , and T910 of the clock CLK.

The data reading-out operation for the second line and the following lines is performed in the same manner as the above-described operation.

Next, the data writing-in operation of the line memory is described.

The read address signal 20 (indicating 38DH) output from the read address counter 12 is received in the write address counter 13 in the clock time-period T1, and an initial value 38DH (909) is obtained in the write address counter 13 by delaying the read address signal 20 by one time-period of the clock CLK. Thereafter, in the time-period T2 of the clock CLK corresponding to the data writing-in for the second line, the initial value 38DH (909) is output from the write address counter 13 as a write address signal 21. Thereafter, the write address signal 21 is received in the memory access signal producing unit 14. Because the least significant bit LSB of the write address signal 21 is an odd number, a write enable signal 27 is output from the memory access signal producing unit 14 to the memory 11 with an address signal 23 which specifies an address of 1C6H (454). Thereafter, dot data LDT of the second line is transferred to the write data bus 29 through the write register 3, and the dot data LDT is written in the address 1C6H (454) of the memory 11 as dot data A2 according to the write enable signal 27 and the address signal 23. Here, because no write enable signal 26 is output in the time-period T2 of the clock CLK, no dot data is written in the memory 10.

In a next time-period T3 of the clock CLK in which the data writing-in for the second line is performed, in the write address counter 13, the read address signal 20(38CH) received in the clock time-period T2 is delayed by one time-period of the clock CLK, and 38CH (908) is output as a write address signal 21. In the memory access signal producing unit 14, the write address signal 21 is received. Because the least significant bit LSB of the write address signal 21 is an even number, a write enable signal 26 is output to the memory 10 with an address signal 22, which specifies an address of 1C6H (454), to access to the memory 10. Thereafter, dot data LDT of the second line is transferred to the write data bus 29 through the write register 3, and the dot data LDT is written in the address 1C6H (454) of the memory 10 as dot data B2 according to the write enable signal 26 and the address signal 22. Here, because no write enable signal 27 is output in the time-period T3 of the clock CLK, no dot data is written in the memory 11.

Thereafter, in the same manner as the above-described operation, the writing-in of dot data of the second line to the memory 11 and the writing-in of dot data of the second line to the memory 10 are alternately performed according to a value of the least significant bit LSB of the write address signal 21 in time-periods T3, T4, - - - , and T910 of the clock CLK.

The data writing-in operation for the third line and the following lines is performed in the same manner as the above-described operation.

As is described above, the data reading-out for the first line and the data writing-in for the second line are described in detail in this embodiment. In conclusion, the dot data A1 is read out from the address 1C6H (454) of the memory 11 in the time-period T1 of the clock CLK, the dot data A2 is written in the address 1C6H (454) of the memory 11 in the time-period T2 of the clock CLK, the dot data B1 is read out from the address 1C6H (454) of the memory 10 in the time-period T2 of the clock CLK, the dot data B2 is written in the address 1C6H (454) of the memory 10 in the time-period T3 of the clock CLK, and dot data C1 is read out from an address 1C5H (453) of the memory 11 in the time-period T3 of the clock CLK. Thereafter, the data reading-out and the data writing-in are performed in the same manner until the time-period T910.

In the first embodiment, the read address counter 12 and the write address counter 13 are respectively operated as a down counter. However, it is applicable that the read address counter 12 and the write address counter 13 be respectively operated as an up counter.

Also, in the first embodiment, the initial value of the read address counter 12 or the write address counter 13 is set according to the trailing edge detecting signal HSEP which detects a trailing edge of the horizontal synchronization signal Hsync. However, it is applicable that the initial value of the read address counter 12 or the write address counter 13 be set according to a detecting signal which detects a leading edge of the reset signal RST.

As is described above, in the first embodiment, the line memory comprises the memories 10 and 11 respectively having a memory capacity of 455 words which is half of the number of words required for one line, the read address counter 12 for producing the read address signal 20 to be used to read out the dot data, the write address counter 13 for producing the write address signal 21 to be used to write the dot data which is obtained by delaying the read address signal 20 by one time-period of the clock CLK, and the memory access signal producing unit 14 for producing the address signals 22 and 23 and the read enable signals 24 and 25 according to the read address signal.20 and producing the address signals 22 and 23 and the write enable signals 26 and 27 according to the write address signal 21. In this line memory, the reading-out of the dot data of the preceding line stored in the memory 11 (or the memory 10) and the writing-in of the dot data of the current line to the memory 10 (or the memory 11) are performed in the same time-period. Also, the dot data of the preceding line is read out from a storing area of a specified address of the memory 11 (or the memory 10) in a certain time-period of the clock CLK, and the dot data of the current line is written in the storing area of the same specified address of the memory 11 (or the memory 10) in a next time-period of the clock CLK following the certain time-period. Accordingly, the double clock 2CLK is not required, and the line memory, in which the memories are operable at the same low speed as that equivalent to the frequency of the clock CLK and are obtained at a low cost, can be manufactured.

Embodiment 2

Figure 3:
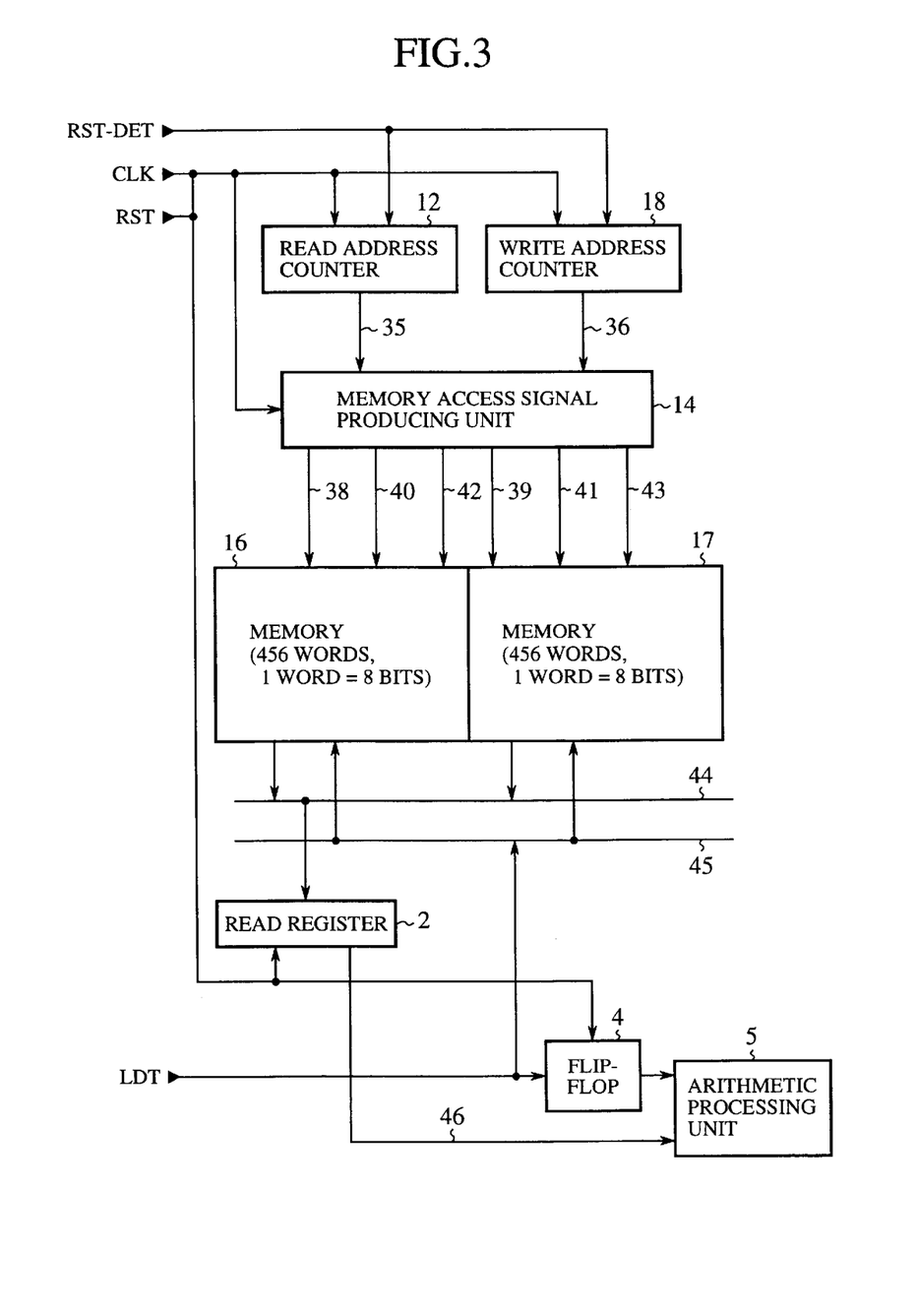
FIG. 3 is a block diagram showing the configuration of a line memory according to a second embodiment of the present invention.

FIG. 3 is a block diagram showing the configuration of a line memory according to a second embodiment of the present invention. In FIG. 3, constituent elements, which are the same as those of the line memory shown in FIG. 1 according to the first embodiment, are indicated by the same reference numerals as those indicating the constituent elements shown in FIG. 1, the description of functions of the same constituent elements as those shown in FIG. 1 is omitted, and constituent elements different from those shown in FIG. 1 are described.

16 and 17 indicate two memories (a first memory and a second memory) having the same memory capacity as each other and respectively having a memory capacity of 456 words (1 word=8 bits) which is obtained by adding 1 word to 455 words equivalent to half of a memory capacity required for one line. Each of the memories 16 and 17 has a sense amplifier (not shown) and an address decoding unit (not shown) in the same manner as in the first embodiment.

12 indicates a read address counter (or a read address producing means) for being initialized by receiving a reset signal RST from the outside, setting an initial value according to a leading edge detecting signal RST-DET which detects a leading edge of the reset signal RST, renewing the initial value according to a clock CLK, and producing a read address signal 35 to be used to read out dot data for each dot.

18 indicates a write address counter (or a write address producing means) for being initialized by receiving the reset signal RST from the outside, setting an initial value according to the leading edge detecting signal RST-DET, renewing the initial value according to the clock CLK, and producing a write address signal 36 to be used to write dot data for each dot. Here, to perform the reading-out of dot data of a preceding line from the memory 17 (or the memory 16) and the writing-in of dot data of a current line to the memory 16 (or the memory 17) in the same time-period, an initial value of the write address signal 36 is set to a value which is obtained by adding one to an initial value of the read address signal 35. That is, an address indicated by the write address signal 36 is placed at a position higher than that indicated by the read address signal 35 by one.

In the first embodiment, the read address signal 20 output from the read address counter 12 is received in the write address counter 13, so that the write address counter 13 is subordinate to the read address counter 12. However, in the second embodiment, the write address counter 18 is independent from the read address counter 12.

Also, the write-register 3 is not used in the second embodiment.

Here, the setting of the initial values of both the read address counter 12 and the write address counter 18 is performed according to the leading edge detecting signal RST-DET. However, in the same manner as in the first embodiment, it is applicable that the setting of the initial values of both the read address counter 12 and the write address counter 18 be performed according to the trailing edge detecting signal HSEP which detects a trailing edge of the horizontal synchronization signal Hsync.

Figure 4:
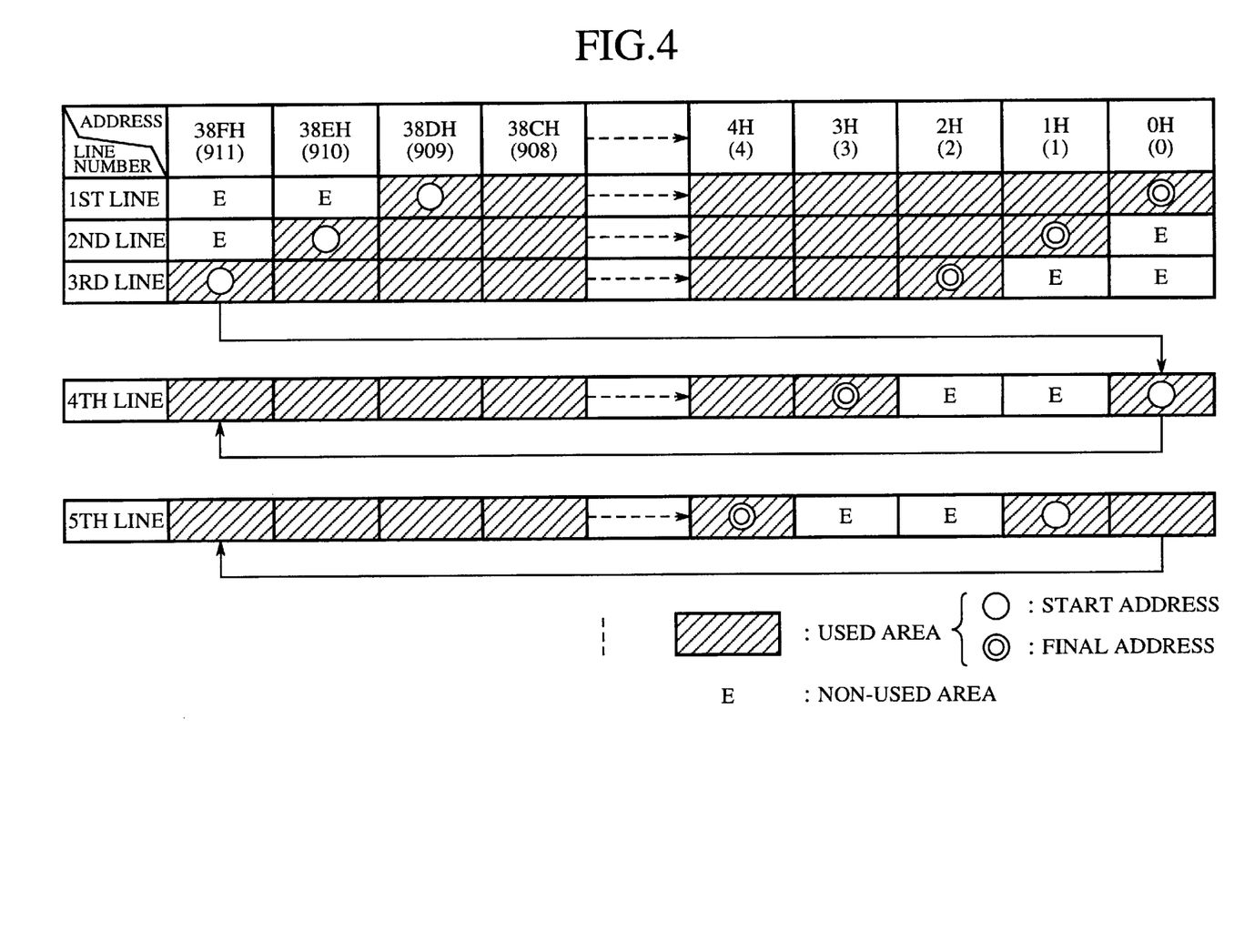
FIG. 4 is a diagram showing the correspondence of addresses of a read address counter and a write address counter to 910 pieces of dot data according to the second embodiment of the present invention.

FIG. 4 is a diagram showing the correspondence of addresses of the read address counter 12 and the write address counter 18 to 910 pieces of dot data according to 5 the second embodiment. In FIG. 4, a slash mark area indicates a used area (or a storing area) of the memory 16 or 17, and a symbol "E" indicates a non-used area (a non-storing area) of the memory 16 or 17. In cases where the number of the address indicated by the read address counter 12 or the write address counter 18 is an even number, the accessing to the memory 16 is performed. In cases where the number of the address indicated by the read address counter 12 or the write address counter 18 is an odd number, the accessing to the memory 17 is performed.

In the second embodiment, in the same time-period of the clock CLK, the writing-in of the dot data of the current line is performed in synchronization with the reading-out of the dot data of the preceding line. However, when the initial values of both the read address signal 35 and the write address signal 36 are counted down from the same value of 38DH in the same manner as in the first embodiment, because the memory 16 or 17 is selected according to the least significant bit LSB of each counted-down value as is described later, there is a problem that the memory 16 or 17 selected according to the least significant bit LSB of the read address signal 35 is the same as that selected according to the least significant bit LSB of the write address signal 36. That is, both the data reading-out and the data writing-in from/to the same memory are simultaneously performed in the same time-period of the clock CLK.

To avoid both the data reading-out and the data writing-in from/to the same memory in the same time-period of the clock CLK, each of the memories 16 and 17 has a redundant memory capacity of 1 word (that is, a memory capacity for one piece of dot data) in addition to the required memory capacity of 455 words, and an initial value of the write address signal 36 is set to a value, which is obtained by adding one to an initial value of the read address signal 35, to shift an address indicated by the write address signal 36 toward the high position by one. Therefore, as shown in FIG. 4, a non-used area "E" corresponding to one word is secured in each of the memories 16 and 17. That is, non-used areas "E" corresponding to two words are secured in the memories 16 and 17. For example, 910 dots of dot data for the first line are stored in areas of 910 addresses which range from the address 38DH (909) to 0H (0) in the memories 16 and 17. In this case, when the data writing-in for the first line is completed, non-used areas (areas indicated by "E" for the first line) are secured in both the address 38EH (910) and 38FH (911) of the memories 16 and 17.

Therefore, to perform both the reading-out of dot data of the first line from an address of one memory 17 (or 16) and the writing-in of dot data of the second line from an address of the other memory 16 (or 17) in each time-period, a write address signal 36, which indicates an initial value of the address 38EH (910, an address indicated by a symbol "○" for the second line) and is obtained by adding one to the initial value 38DH (909) of the read address signal 35, is output from the write address counter 18. Accordingly, because the initial value or the counted-down value of the write address signal 36 is an even number (or an odd number) when the initial value or the counted-down value of the read address signal 35 is an odd number (or an even number), the data reading-out and the data writing-in from/to the same memory in the same time-period of the clock CLK can be prevented. That is, because both the reading-out of first dot data of the first line from an address of the memory 17, which corresponds to the initial value 38DH (909) of the read address signal 35, and the writing-in of first dot data of the second line from an address of the memory 17, which corresponds to the initial value 38EH (910) of the write address signal 36, are performed in the first time-period, the data reading-out from one memory 17 (or 16) and the data writing-in to the other memory 16 (or 17) can be simultaneously performed in each time-period. As a result, when the data writing-in for the second line is completed, non-used areas (addresses indicated by "E" for the second line) are secured in both the address 38FH (911) and 0H (0) of the memories 16 and 17.

As is apparent in FIG. 4, one non-used area "E" corresponding to one word is necessarily secured in the address higher than the initial value of the read address signal 35 for each of the memories 16 and 17. Therefore, the initial value of the write address signal 36 used to write dot data of a succeeding line is set to a value which is obtained by adding one to the initial value of the read address signal 35 set for the current line. That is, for a remarked line denoting each of the second line and lines following the second line, the initial value of the read address signal 35 set for the remarked line is the same as that of the write address signal 36 set for the remarked line (which denotes a line preceding to a succeeding line of the remarked line), and the initial value of the write address signal 36 for the writing-in of dot data of a current line is equal to a value which is obtained by adding one to the initial value of the read address signal 35 for the reading-out of dot data of a preceding line.

As shown in FIG. 4, the initial value of the write address signal 36 for the writing-in of dot data of the fourth line and the initial value of the read address signal 35 for the reading-out of dot data of the fourth line are the same address 0H (0), and the initial values are counted down in the order of 0H (0), 38FH, 38EH, - - - , and 3H (3) in the read address counter 12 and the write address counter 18. Because a memory capacity required in the memories 16 and 17 is 912 words (910 words+2 words), addresses possible to be indicated by each of the read address signal 35 and the write address signal 36 range from 0H to 38FH (911), and the initial values are counted down or up while cyclically changing the initial values in the range.

In the data writing-in and reading out for the fifth line and the following lines, the initial values of the read address signal 35 and the write address signal 36 are respectively incremented to 1H (1), 2H (2), - - - for each line.

Also, in the second embodiment, because the reading-out of the dot data of a preceding line and the writing-in of the dot data of a current line are simultaneously performed in the same time-period of the clock CLK, the write register 3 of the first embodiment, in which the dot data of the current line is delayed by one time-period of the clock CLK, is not required. Here, in the first embodiment, because it is required to delay the writing-in timing of the dot data of a current line by one time-period of the clock CLK as compared with the reading-out timing of the dot data of a preceding line, the write register 3 is required.

Next, an operation is described.

Figure 5:
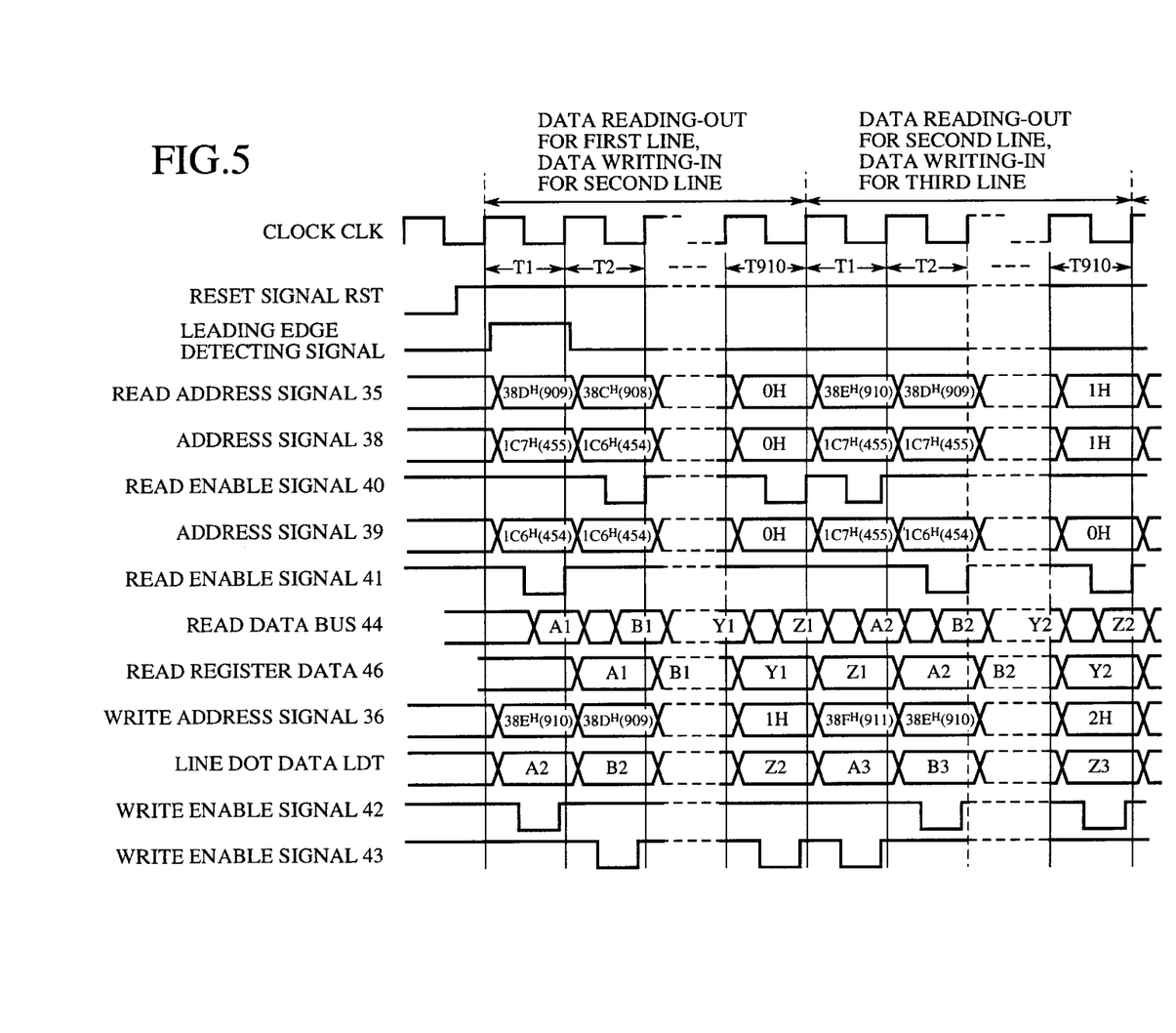
FIG. 5 is a time chart showing an operation of each unit of the line memory according to the second embodiment of the present invention.

FIG. 5 is a time chart showing an operation of each unit of the line memory according to the second embodiment of the present invention.

When a reset signal RST is received in the read address counter 12 and the write address counter 18, the read address counter 12 and the write address counter 18 are respectively initialized, and a leading edge detecting signal RST-DET, which detects a leading edge of the reset signal RST, is generated in synchronization with the clock CLK. In the read address counter 12, an initial value is set to 38DH (909) according to the leading edge detecting signal RST-DET, and the initial value set to 38DH (909) is initially output as a read address signal 35. Also, the initial value is renewed (or counted down) in synchronization with the clock CLK, and the read address signal 35 of the renewed (or counted-down) value is output. In the write address counter 18, an initial value is set to 38EH (910) simultaneously with the read address signal set to 38DH (909), and the initial value set to 38EH (910) is initially output as a write address signal 36. Also, the initial value set to 38EH (910) is renewed (or counted down) in synchronization with the clock CLK, and the write address signal 36 of the renewed (or counted-down) value is output.

The selection of the memory 16 or the memory 17, in which a data reading-out operation or a data writing-in operation is performed, is determined according to a least significant bit LSB of the read address signal 35 or the write address signal 36 input to the memory access signal producing unit 14. That is, in cases where the read address signal 35 or the write address signal 36 is an odd number, the memory 17 is selected. Also, in cases where the read address signal 35 or the write address signal 36 is an even number, the memory 16 is selected.

Figure 6:
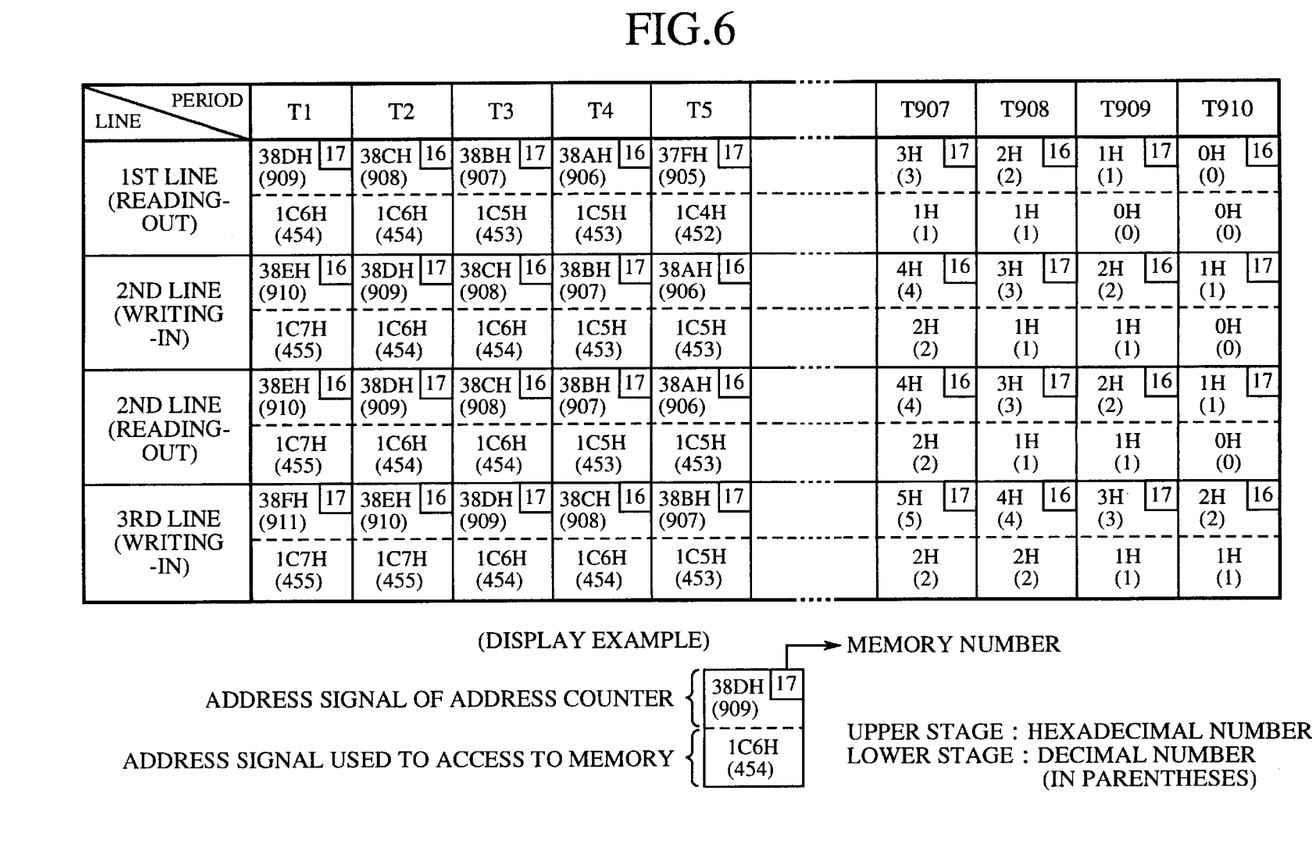
FIG. 6 is a diagram, which shows the correspondence of an address of a read address signal or a write address signal to an address of each memory, in the line memory according to the second embodiment of the present invention.

FIG. 6 is a diagram, which shows the correspondence of an address of the read address signal 35 or the write address signal 36 in the data reading-out or the data writing-in to an address of an address signal 38 or 39 used to access to the memory 16 or 17 for each time-period of the clock CLK, in the line memory according to the second embodiment of the present invention. Time-periods T1 to T910 of the clock CLK are indicated in the lateral direction, an address in the reading-out of dot data of the first line is shown in the top row for each time-period, an address in the writing-in of dot data of the second line is shown in the second row for each time-period, an address in the reading-out of dot data of the second line is shown in the third row for each time-period, and an address in the writing-in of dot data of the third line is shown in the fourth row for each time-period.

A reading-out operation of the line memory is initially described.

In this embodiment, dot data is read out from the memory 17 at the start, the data reading-out from the memory 16 and the data reading-out from the memory 17 are alternately performed, dot data is read out from the memory 17 when the read address signal 35 is an odd number, and dot data is read out from the memory 16 when the read address signal 35 is an even number.

As shown in FIG. 5, a data reading-out operation for the first line is started from the initial value 38DH (909) of the read address signal 35, and the initial value is counted down to 38CH (908), 38BH (907), - - - until the counted-down value reaches 0H (0).

In case of the data reading-out for the first line, in a time-period T1 of the clock CLK, because the first counted value 38DH (909) is an odd number, a read enable signal 41 is output, dot data A1 of the first line is read out from the memory 17 (the address=1C6H (454) indicated by an address signal 39, refer to FIG. 6) to the read data bus 44, and the dot data A1 is output from the read register 2 as read register data 46.

In a next time-period T2 of the clock CLK in which the data reading-out for the first line is performed, the read address signal 35 is counted down to 38CH (908). Because 38CH (908) is an even number, a read enable signal 40 is output, dot data B1 of the first line is read out from the memory 16 (the address=1C6H (454) indicated by an address signal 38, refer to FIG. 6) to the read data bus 44, and the dot data B1 is output from the read register 2 as read register data 46. Thereafter, in a final time-period T910 of the clock CLK in which the data reading-out for the first line is performed, the read address signal 35 is counted down to 0H (0). Because 0H (0) is regarded as an even number, a read enable signal 40 is output, dot data Z1 of the first line is read out from the memory 16 (the address=0H (0) indicated by an address signal 38, refer to FIG. 6) to the read data bus 44, and the dot data B1 is output from the read register 2 as read register data 46. Therefore, the data reading-out for the first line is completed.

In the data reading-out for the second line, 38EH (910) is set as an initial value in the read address counter 12. In the first time-period T1 of the clock CLK, because 38EH (910) is an even number, a read enable signal 40 is output, dot data A2 of the second line is read out from the memory 16 (the address=1C7H (455) indicated by an address signal 38, refer to FIG. 6) to the read data bus 44, and the dot data A2 is output from the read register 2 as read register data 46.

In the next time-period T2 of the clock CLK in which the data reading-out for the second line is performed, the read address signal 35 is counted down to 38DH (909). Because 38DH (909) is an odd number, a read enable signal 41 is output, dot data B2 of the second line is read out from the memory 17 (the address=1C6H (454) indicated by an address signal 39, refer to FIG. 6). Thereafter, in the final time-period T910 of the clock CLK in which the data reading-out for the second line is performed, the read address signal 35 is counted down to 1H (1). Because 1H (1) is an odd number, a read enable signal 41 is output, dot data Z2 of the second line is read out from the memory 17 (the address=0H (0) indicated by an address signal 39, refer to FIG. 6). Therefore, the data reading-out for the second line is completed.

In the data reading-out operation for the third line and the following lines, an initial value of the read address signal 35 for each line is set to a value which is equal to an initial value of the write address signal 36 for the same line, and the above-described operation is repeatedly performed. In this case, after the initial value of the read address signal 35 for the third current line is set to 38FH, the initial value of the read address signal 35 for the fourth current line is set to 0H to cyclically change the initial values, and the reading-out of dot data from the address 38FH is performed next to the reading-out of dot data from the address 0H.

Next, a writing-in operation of the line memory is described.

In FIG. 5, because the initial value set in the read address counter 12 is 38DH (909) to perform the data reading-out for the first line, 38EH (910), which is higher than 38DH (909) by one, is set as an initial value in the write address counter 18 to perform the writing-in of dot data of the second line in the same time-periods as those in which the data reading-out for the first line is performed. Because no dot data is written in the one-word address of the memory 16, which corresponds to the initial value 38EH (910), in the data writing-in for the first line, the one-word address of the memory 16 is set to an empty state. Therefore, because the first dot data of the second line is written in the one-word address of the memory 16, an operation, in which dot data of the second line is written in an address in which dot data of the first line not yet read out is stored, can be prevented. Thereafter, the write address signal 36 is counted down from the initial value 38EH (910) to 38DH (909), 38CH (908), - - - in the write address counter 18 until a counted value 1H(1) is obtained.

In the time-period T1 of the clock CLK in which the data writing-in for the second line is performed, the initial value 38EH (910) of the write address signal 36 is an even number. Therefore, a write enable signal 42 is output, and dot data A2 of the second line is written in the memory 16 (the address=1C7H (455) indicated by an address signal 38, refer to FIG. 6) through the write data bus 45.

In the time-period T2 of the clock CLK in which the data writing-in for the second line is performed, the write address signal 36 is counted down to 38DH (909). Because 38DH (909) is an odd number, a write enable signal 43 is output, and dot data B2 of the second line is written in the memory 17 (the address=1C6H (454) indicated by an address signal 39, refer to FIG. 6) through the write data bus 45.

The above-described operation is repeated. In the final time-period T910 in which the data writing-in for the second line is performed, the write address signal 36 is counted down to 1H (1). Because 1H (1) is an odd number, a write enable signal 43 is output, and dot data Z2 of the second line is written in the memory 17 (the address=0H (0) indicated by an address signal 39, refer to FIG. 6). Therefore, the data writing-in for the second line is completed.

In the data writing-in for the third line, because 38EH (910) is set as the initial value in the read address counter 12 to perform the data reading-out for the second line, 38FH (911), which is higher than 38EH (910) set in the read address counter 12 by one, is set as an initial value in the write address counter 18. Because no dot data is written in the one-word address of the memory 17, which corresponds to the initial value 38FH (911), in the data writing-in for the second line, the one-word address of the memory 17 is set to an empty state. Therefore, because the first dot data of the third line is written in the one-word address of the memory 17, an operation, in which dot data of the third line is written in an address in which dot data of the second line not yet read out is stored, can be prevented. Thereafter, the write address signal 36 is counted down from the initial value 38FH (911) to 38EH (910), 38DH (909), - - - in the write address counter 18 until a counted value 2H (2) is obtained.

In the time-period T1 of the clock CLK in which the data writing-in for the third line is performed, the initial value 38FH (911) of the write address signal 36 is an odd number. Therefore, a write enable signal 43 is output, and dot data A3 of the third line is written in the memory 17 (the address=1C7H (455) indicated by an address signal 39, refer to FIG. 6) through the write data bus 45.

In the time-period T2 of the clock CLK in which the data writing-in for the third line is performed, the write address signal 36 is counted down to 38EH (910). Because 38EH (910) is an even number, a write enable signal 42 is output, and dot data B3 of the third line is written in the memory 16 (the address=1C7H (455) indicated by an address signal 38, refer to FIG. 6) through the write data bus 45.

The above-described operation is repeated. In the final time-period T910 in which the data writing-in for the third line is performed, the write address signal 36 is counted down to 2H (2). Because 2H (2) is an even number, a write enable signal 42 is output, and dot data Z3 of the third line is written in the memory 16 (the address=1H (1) indicated by an address signal 38, refer to FIG. 6). Therefore, the data writing-in for the third line is completed.

In the data writing-out operation for the fourth line and the following lines, the initial value of the write address signal 36 for each current line is set to a value which is obtained by adding one to the initial value of the read address signal 35 set in the data reading-out for the preceding line, and the above-described operation is repeatedly performed. In this case, after the initial value of the write address signal 36 for the third current line is set to 38FH, the initial value of the write address signal 36 for the fourth current line is set to 0H to cyclically change the initial values, and the write-in of dot data to the address 38FH is performed next to the write-in of dot data to the address 0H.

As is described above, both the data reading-out for the first line and the data writing-in for the second line and both the data reading-out for the second line and the data writing-in for the third line are described in detail. In conclusion, in case of both the data reading-out for the first line and the data writing-in for the second line, in the time-period T1 of the clock CLK, the dot data A1 of the first line is read out from the address 1C6H (454) of the memory 17, and the dot data A2 of the second line is written in the address 1C7H (455) of the memory 16. In the time-period T2 of the clock CLK, the dot data B1 of the first line is read out from the address 1C6H (454) of the memory 16, and the dot data B2 of the second line is written in the address 1C6H (454) of the memory 17. In the time-period T3 of the clock CLK, the dot data C1 of the first line is read out from the address 1C5H (453) of the memory 17, and the dot data C2 of the second line is written in the address 1C6H (454) of the memory 16. Thereafter, both the data reading-out and the data writing-in are performed in the same manner until the time-period T910.

In the above description, the redundant memory capacity in each of the memories 16 and 17 is one word to set a difference between the address of the read address signal 35 and the address of the write address signal 36 in the same time-period to one and an odd number. However, it is applicable that the redundant (or extra) memory capacity in each of the memories 16 and 17 be two words or more.

Figure 7A:
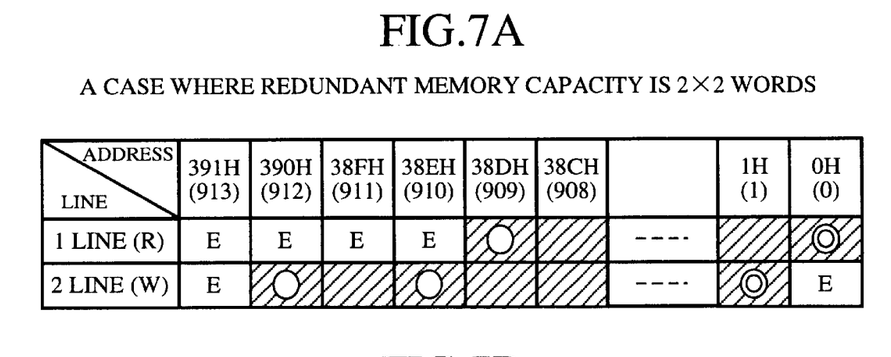
FIG. 7A is a diagram showing the correspondence of addresses of a read address counter and a write address counter to 910 pieces of dot data, in cases where the line memory has a redundant memory capacity of 2×2 words, according to a modification of the second embodiment of the present invention.

FIG. 7A is a diagram showing the correspondence of addresses of the read address counter 12 and the write address counter 18 to 910 pieces of dot data, in cases where the line memory has a redundant memory capacity of 2×2 words, according to a modification of the second embodiment of the present invention. Because 910 pieces of dot data for the first line have been already written in the addresses 38DH (909) to 0H (0), a start address of the read address signal 35 is 38DH (memory 17). Also, the writing-in of dot data of the second line is started from either an address 38EH 910, memory 16) or an address 390H 912, memory 16) of the write address signal 36. In this case, a difference-between the address of the read address signal 35 and the address of the write address signal 36 in the same time-period is one or three and is an odd number.

Figure 7B:
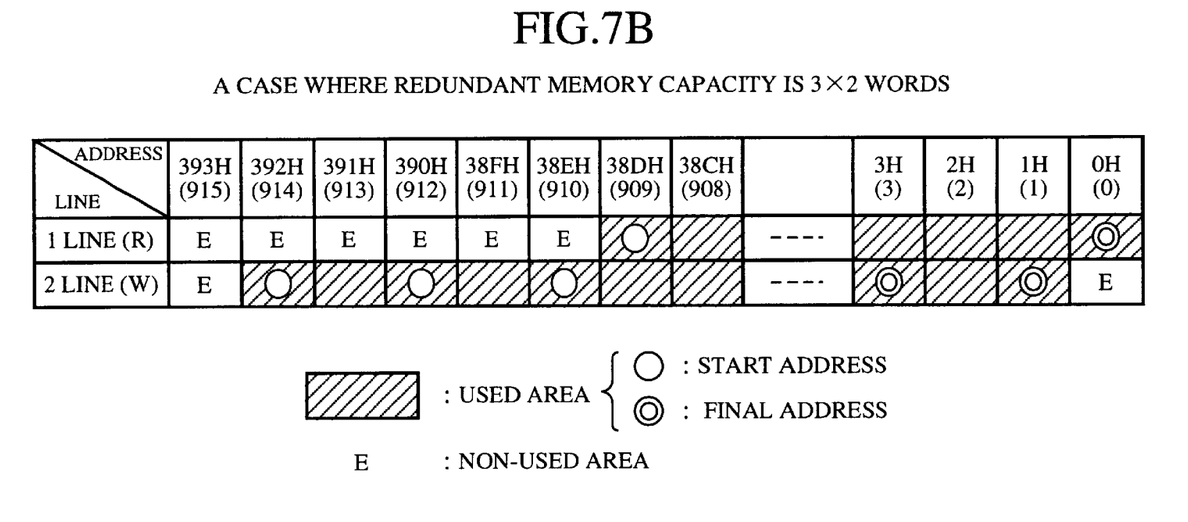
FIG. 7B is a diagram showing the correspondence of addresses of a read address counter and a write address counter to 910 pieces of dot data, in cases where the line memory has a redundant memory capacity of 3×2 words, according to another modification of the second embodiment of the present invention.

FIG. 7B is a diagram showing the correspondence of addresses of the read address counter 12 and the write address counter 18 to 910 pieces of dot data, in cases where the line memory has a redundant memory capacity of 3×2 words, according to another modification of the second embodiment of the present invention. In the same manner as the modification of FIG. 7A, in cases where a start address of the read address signal 35 is 38DH (memory 17), the writing-in of dot data of the second line is started from an address 38EH (910, memory 16), an address 390H (912, memory 16) or an address 392H (914, memory 16) of the write address signal 36. In this case, a difference between the address of the read address signal 35 and the address of the write address signal 36 in the same time-period is one, three or five and is an odd number.

As is described above, in cases where the number of words of the redundant memory capacity is increased two and two, it is apparent that a difference between the address of the read address signal 35 and the address of the write address signal 36 in the same time-period is always an odd number.

In the second embodiment, the read address counter 12 and the write address counter 18 are respectively operated as a down counter. However, it is applicable that the read address counter 12 and the write address counter 18 be respectively operated as an up counter.

As is described above, in the second embodiment, the line memory comprises the memories 16 and 17 respectively having the redundant memory capacity in addition to a memory capacity of 455 words which are half of a memory capacity required for one line, the read address counter 12 for producing the read address signal 35 to be used to read out the dot data, the write address counter 18 for producing the write address signal 36 of which the value is higher than that of the read address signal 35 by one, and the memory access signal producing unit 14 for producing the address signals 38 and 39 and the read enable signals 40 and 41 according to the read address signal 35 and producing the address signals 38 and 39 and the write enable signals 42 and 43 according to the write address signal 36. In this line memory, the address signal 39 or 38 produced according to the write address signal 36 specifies an address of an area of the memory 17 or 16, in which no dot data of a preceding line is stored, or an address of the memory 17 or 16 which is set to a non-storing state because dot data of a preceding line has been already read out, and both the reading-out of dot data of the preceding line stored in one memory 17 or 16 and the writing-in of dot data of a current line to the other memory 16 or 17 are performed in the same time-period. Accordingly, the double clock 2CLK is not required, and the line memory, in which the memories are operable at the same low speed as that equivalent to the frequency of the clock CLK and are obtained at a low cost, can be manufactured.

What is claimed is:

1. A line memory comprising:

first and second memories respectively having a memory capacity which is half of a memory capacity required to store all pieces of dot data of one line;

read address producing means for producing a read address signal to be used to read out the dot data for each dot;

write address producing means for producing a write address signal to be used to write the dot data for each dot; and a memory access signal producing unit for performing, for each time-period of a reading-out or a writing-in, both the production of an address signal, which specifies an address of the first memory or the second memory, and a read enable signal, which is used to alternately read out dot data of a preceding line stored in the first memory or the second memory, according to the read address signal produced by the read address producing means and the production of an address signal, which specifies an address of the second memory or the first memory, and a write enable signal, which is used to alternately write dot data of a current line stored in the second memory or the first memory, according to the write address signal produced by the write address producing means, wherein both the reading-out of the dot data of the preceding line stored in the first memory or the second memory and the writing-in of the dot data of the current line to the second memory or the first memory are performed in the same time-period.

2. A line memory according to claim 1, wherein the dot data of the preceding line is read out from a storing area of a specified address of the first memory or the second memory in a first time-period of the reading-out or the writing-in, and the dot data of the current line is written in the storing area of the address of the first memory or the second memory in a second time-period.

3. A line memory comprising:

first and second memories respectively having a redundant memory capacity of at least one piece of dot data in addition to a memory capacity which is half of a memory capacity required to store all pieces of dot data of one line;

read address producing means for producing a read address signal to be used to read out the dot data for each dot;

write address producing means for producing a write address signal to be used to write the dot data for each dot; and a memory access signal producing unit for performing, for each time-period of a reading-out or a writing-in, both the production of an address signal, which specifies an address of the first memory or the second memory, and a read enable signal, which is used to alternately read out dot data of a preceding line stored in the first memory or the second memory, according to the read address signal produced by the read address producing means and the production of an address signal, which specifies an address of the second memory or the first memory, and a write enable signal, which is used to alternately write dot data of a current line stored in the second memory or the first memory, according to the write address signal produced by the write address producing means, wherein the address signal produced according to the write address signal in the memory access signal producing unit specifies either an address of an area of the second memory or the first memory, in which no dot data of the preceding line is stored, or an address of the second memory or the first memory which is set to a non-stored state by reading out the dot data of the preceding line, and both the reading-out of the dot data of the preceding line stored in the first memory or the second memory and the writing-in of the dot data of the current line to the second memory or the first memory are performed in the same time-period.

4. A line memory according to claim 3, wherein a difference between the read address signal produced by the read address producing means and the write address signal produced by the write address producing means in the same time-period is an odd number.

* * * * *